March 31, 1942.  R. A. OPENSHAW  2,278,015
AIRPLANE STABILIZER
Filed May 1, 1939  3 Sheets-Sheet 1
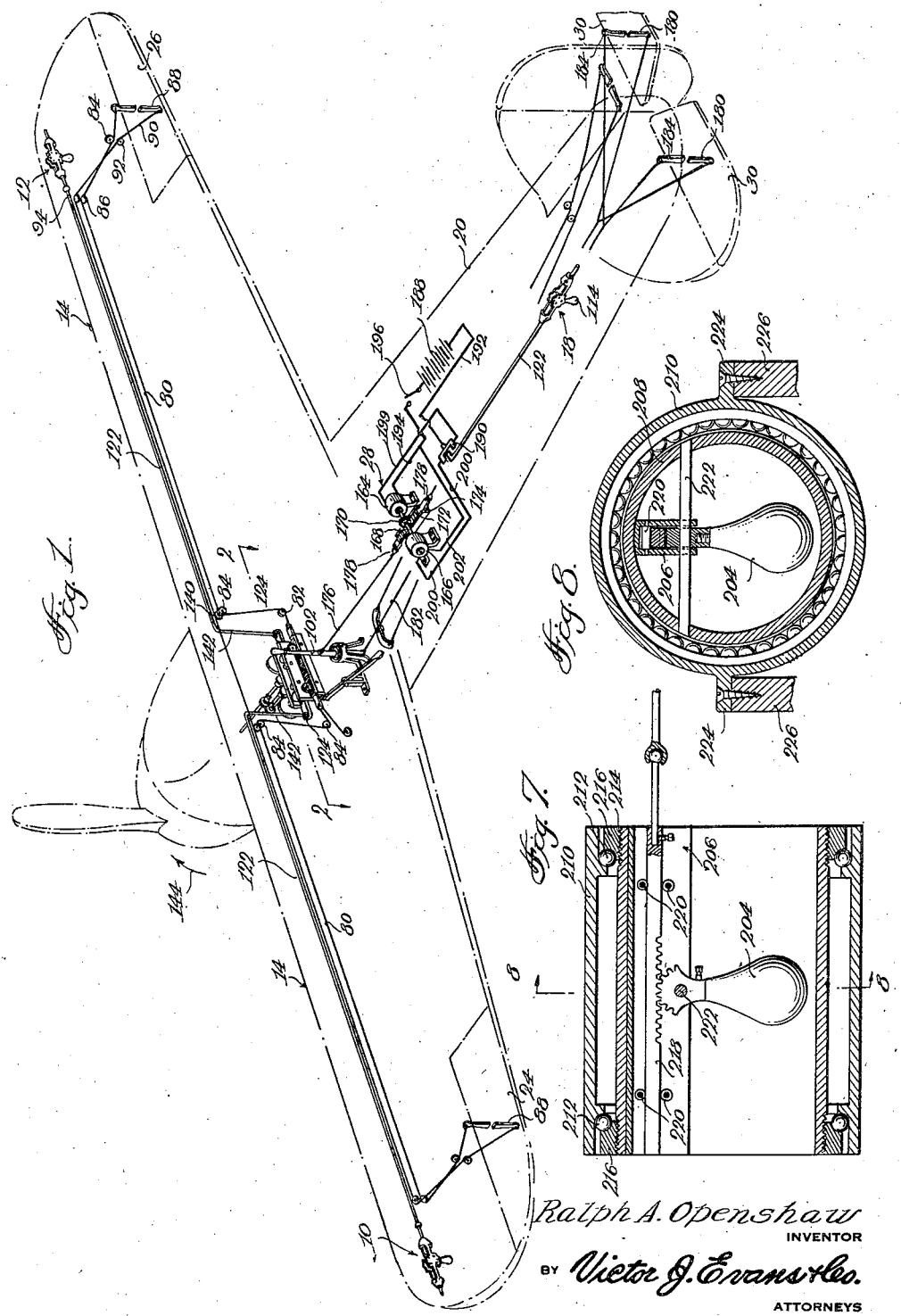
Ralph A. Openshaw
INVENTOR
BY Victor J. Evans & Co.
ATTORNEYS March 31, 1942.  R. A. OPENSHAW  2,278,015
AIRPLANE STABILIZER
Filed May 1, 1939   3 Sheets-Sheet 2
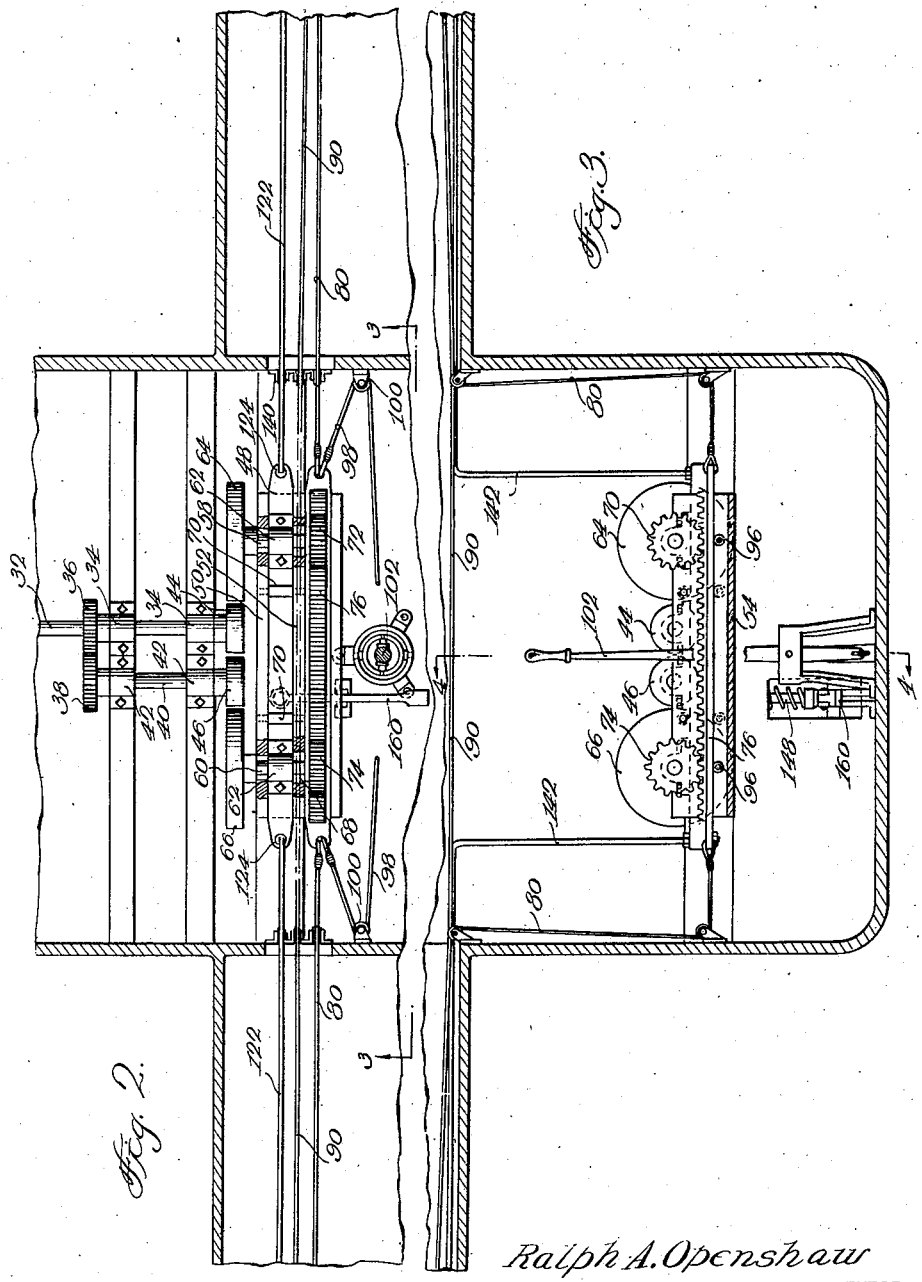
Ralph A. Openshaw
INVENTOR
BY Victor J. Evans & Co.
ATTORNEYS

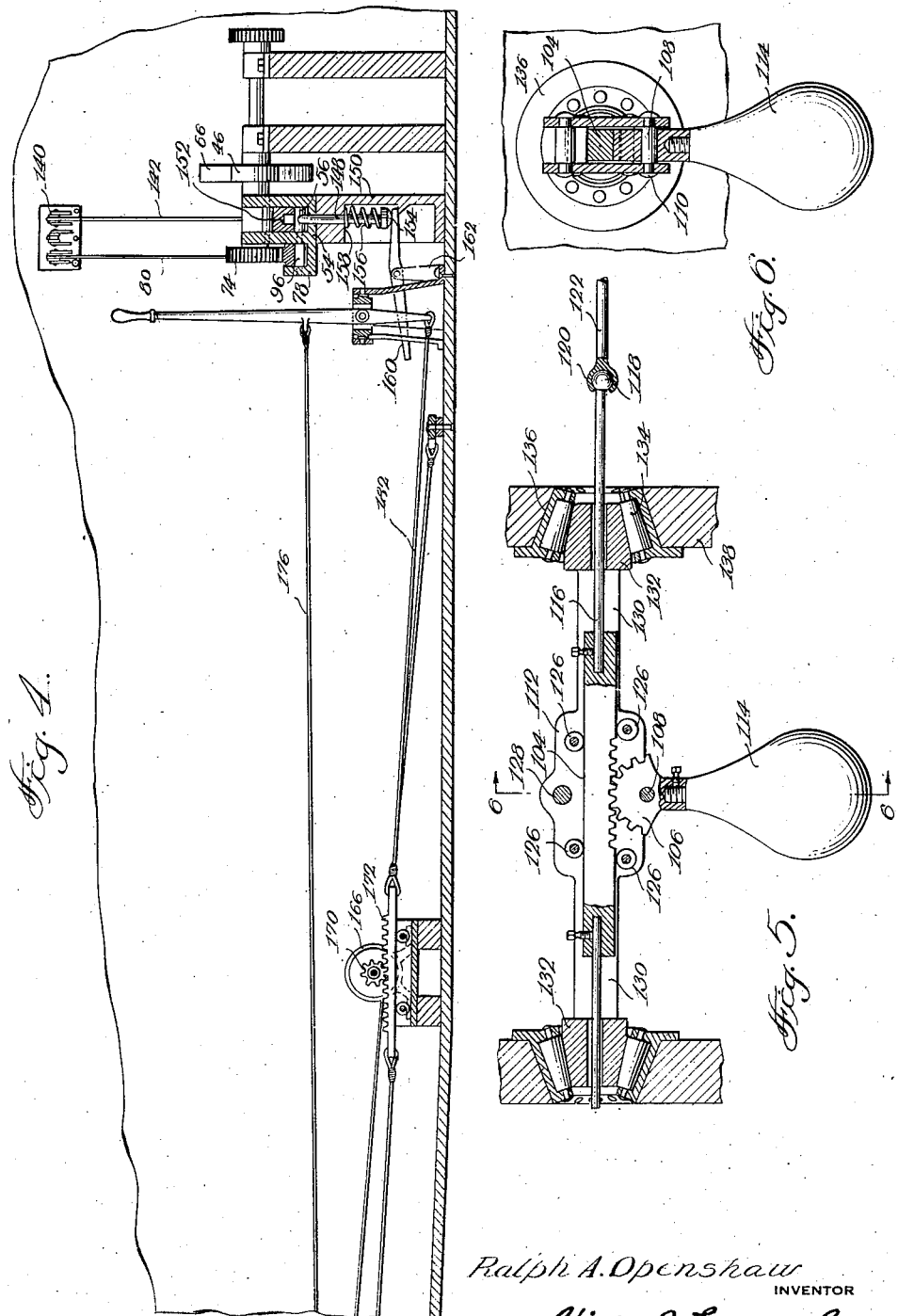

Patented Mar. 31, 1942

2,278,015

UNITED STATES PATENT OFFICE 2,278,015

AIRPLANE STABILIZER

Ralph A. Openshaw, Mesa, Ariz.

Application May 1, 1939, Serial No. 271,136

7 Claims. (Cl. 244—80)

My invention relates to airplanes, and has among its objects and advantages the provision of an improved stabilizer.

An object of my invention is to provide an automatic stabilizer embodying power actuated means for automatically maintaining an airplane at level flight, which means function to automatically return the airplane to a level position after deviating from such flight, wherein I provide gravity sensitive means for setting the power operators into motion. The gravity sensitive means is of sufficient weight to properly and efficiently set the power means into operation, but the power means functions to actuate the ailerons and elevators of the ship without aid from the gravity sensitive means, so that the latter may be of relatively small proportions and weight. My power actuated means employs power from the engine of the ship for actuating the ailerons, and motors are incorporated in the plane for actuating the elevators.

In the accompanying drawings:

Figure 1 is a perspective view diagrammatically illustrating an airplane embodying my stabilizer;

Figure 2 is a view taken from the position indicated by line 2—2 of Figure 1 but considerably enlarged;

Figure 3 is a view taken from the position indicated by line 3—3 of Figure 2;

Figure 4 is a sectional view along the line 4—4 of Figure 3;

Figure 5 is an enlarged sectional view of the bearing mount for one of the gravity sensitive elements;

Figure 6 is a sectional view along the line 6—6 of Figure 5;

Figure 7 is a sectional detail view of a modified bearing mount for one of the gravity sensitive elements; and Figure 8 is a sectional view substantially along the line 8—8 of Figure 7.

In the embodiment selected to illustrate my invention, I make use of gravity sensitive elements 10 and 12 located in the wings 14 near their outer ends, and gravity sensitive element 18 located in the fuselage 20, preferably near its rear end. Inside the fuselage 20 I mount a stabilizing mechanism 22 which is actuated through the medium of the elements 10 and 12 for actuating the ailerons 24 and 26. Element 18 sets a power mechanism 28 into operation for actuating the elevators 30. Power unit 22 derives its power from the engine of the airplane, while unit 28 may comprise electric motors provided with a circuit having a switch mechanism actuated by the element 18 for selectively opening and closing the circuits of the respective motors.

Figure 2 illustrates a portion of a shaft 32 which comprises an extended end of the crankshaft of the engine. Shaft 32 is journaled in bearings 34, and the pinion 36 keyed to the shaft is in mesh with a pinion 38 keyed on a shorter shaft 40 journaled in bearings 42. A fiber friction wheel 44 is keyed to the shaft 32, and a similar friction wheel 46 is keyed to the shaft 40, which friction wheels are spaced slightly so as to have no contact one with the other.

A bar 48 is slidable between walls 50 and 52, which walls are interconnected by a floor 54. Figures 2 and 4 illustrate roller bearings 56 as being located underneath the bar 48 to lend free and easy movement thereto. Shafts 58 and 60 are journaled in bearings 62 on the bar 48, and fiber friction wheels 64 and 66 are respectively keyed to the shafts 58 and 60. Normally the wheels 64 and 66 are spaced slightly from their respective drive wheels 44 and 46, but the wheels 64 and 66 may be independently brought into driving relation with their respective wheels 44 and 46 through shifting of the bar 48. Walls 50 and 52 are provided with elongated openings 68 through which the shafts 58 and 60 move freely as the bar 48 is moved. I provide roller bearings 70 which extend across the upper face of the bar 48 for holding the same in place.

A pinion 72 is keyed to the shaft 58, and a similar pinion 74 is keyed to the shaft 60, both of which pinions are arranged in mesh with a rack 76 slidable between the wall 52 and a wall 78, see Figure 4. To the ends of the rack 76 I connect control cables 80 which pass over pulleys 82 and 84 to be extended longitudinally of the wings for passage about pulleys 86 and 87 for connection with the horns 88 associated with the ailerons 24 and 26. These horns are also connected with a control cable 90 which passes around pulleys 92 and 94. Rack 76 moves longitudinally between the walls 52 and 78, which walls are interconnected by the bottom 54, between which bottom and the rack I position roller bearings 96. The ends of the rack 76 are also connected with cables 98 which pass around pulleys 100 for connection with the control stick 102 of the usual type.

Gravity sensitive elements 10, 12 and 18 are identical in construction so that the description of one will apply to all. Figures 5 and 6 illustrate the element 10, which element includes a rack 104 arranged in mesh with a segmental gear 106 arranged for rotation about the shaft 108 having its ends riveted at 110 to the guide plates 112 between which the rack 104 is positioned. To the segmental gear 106 I connect a weight 114 which tends to assume a vertical position and which oscillates about the axis of the shaft 108 through any tilting action of its associated wing 14 about a transverse axis, or rotation of the airplane about the longitudinal axis of the fuselage 20. Oscillation of the weight 114 imparts reciprocatory motion to the rack 104, and this rack has one end connected with a rod 116, which rod is provided with a ball 118 fitting loosely inside the socket 120 on one end of a control rod 122 having its other end connected with one end of the bar 48, as at 124 in Figures 1 and 2. Referring to Figure 3, it will be noted that the gravity sensitive elements 10 and 12 are connected with the bar 48, and that the elements have their racks 104 arranged in axial alignment so that oscillatory movement of the two weights 114 will move the control rods 122 in the same direction, so that the units 10 and 12 function as a common unit with respect to the bar 48.

In Figure 5, plates 112 support roller sleeves 126 which engage the upper and lower faces of the rack for guiding the same. The plates are additionally secured in spaced relation through the medium of a shaft 128. Plates 112 include arms 130 cast integrally with tapered bearing heads 132 supported by roller bearings 134 housed in the bearing retainers 136 carried by supports 138 incorporated in the wing structure of the airplane. It will thus be seen that rack 104 is mounted for rotation about its longitudinal axis so that the weight 114 may always take a vertical position with respect to any shift of the airplane about a transverse axis. In this way the weights 114 are assured free movement.

The rods 122 ride on grooved wheels 140 and are bent to provide right-angular reaches 142, the lower ends of which are connected at 124 with the bar 48. Rotation of the airplane about its longitudinal axis in the direction of the arrow 144 of Figure 1 will cause the rods 122 to be moved to the right for moving the bar 48 in the corresponding direction. Such movement of the bar 48 will bring the friction wheel 66 into frictional relation with the friction wheel 46, which is driven through the medium of the pinions 36 and 38 and the shaft 32. Engagement between the wheels 46 and 66 will impart rotation to the pinion 74 for actuating the rack 76 and operate the ailerons 24 and 26 through the medium of the control wires 80 and 90 in the usual manner. Similarly, rotation of the airplane about its longitudinal axis in the opposite direction will bring the wheel 64 into engagement with the wheel 44, which engagement will shift the rack 76 in the opposite direction and again actuating the ailerons 24 and 26 in the usual manner. It will thus be seen that the gravity sensitive elements 10 and 12 actuate the wheels 64 and 66 for selectively bringing the same into engagement with their respective driving wheels 44 and 46, so that power from the shaft 32 is utilized for manipulating the ailerons 24 and 26. Wheels 64 and 66 in combination with their drive wheels 44 and 46 may be considered as clutches with the elements 10 and 12 functioning as clutch actuating means only. Accordingly, I make use of power means for operating the ailerons so that the gravity sensitive means need not perform any function in the actual manipulation of the ailerons. Thus the gravity sensitive means may be designed so as to have sufficient power to operate the clutch mechanism only, and the burden of manipulating the ailerons is performed by power means separate and apart from the gravity responsive mechanism. My invention is associated with conventional control wires and ailerons, which ailerons may be manipulated manually independently of the automatic mechanism through the medium of the control stick 102.

To render the automatic mechanism inoperative as when desiring manual control, I provide a pin 148 which is slidably supported by a bracket 150 arranged to project through an opening in the wall 54 to bring its end into the opening or bore 152 in the bar 48. Pin 148 carries a head 154 against which one end of a compression spring 156 abuts, with the opposite end of the spring abutting the ledge 158 of the bracket 150, which bracket serves as a mount for the floor 54. A foot actuated lever 160 is pivoted intermediate its ends to a bracket 162, and one end of the lever lies underneath the head 154. Thus the pin 148 may be pushed upwardly through the medium of the foot controlled lever 160 for pushing the lever into the bore 152 so as to latch the bar 48 against relative movement. Wall 152 is so located as to bring the pin 148 therein when the wheels 64 and 66 have complete clearance from their respective drive wheels 44 and 46, thus permitting free manipulation of the control stick 102.

Power unit 28 comprises two electric motors 164 and 166 mounted inside the fuselage and the armature of each motor connected with a shaft 168 provided with a pinion 170 arranged in mesh with a rack 172 slidable longitudinally in a fixed guide 174. Rack 172 is interposed in the control wire 176, with the wire severed and connected with the ends of the rack as at 178. Wire 176 connects with the horns 180 of the elevators 30, while the usual second control wire 182 connects with the horns 184. Wires 176 and 182 are connected with the control stick 102 in the usual manner.

A battery 188 is connected with a switch 190 through the medium of a wire 192. A wire 194 leads from the battery 188 to the motor 164, and in the wire I interpose a switch 196 which is manually controlled and remains closed during the operating period of the unit 28. A wire 198 leads from the motor 164 to the switch 190, and the latter is connected with a wire 200 which leads to the motor 166. A wire 202 leads from the motor 166 to the wire 194. The control rod 122 of the unit 18 is operatively connected with the switch 190 so as to close the circuit through the motor 166 when the rod is advanced forwardly through the medium of the weight 114. Similarly, rearward movement of the rod closes the circuit to the motor 164.

Element 18 is brought into play whenever the airplane rotates about a transverse axis for selectively controlling the motors 164 and 166 to manipulate the elevators 30. The circuits through the motors 164 and 166 can be closed one at a time only. As an example, a forward shift of the rod 122 will energize the motor 166 and rotate the pinion 170 in such direction as to move the rack 168 forwardly to pivot the elevators to pivot downwardly for bringing the plane back to normal flight. Should the tail of the plane rise, the control rod 122 would be shifted rearwardly for closing the circuit through the motor 164, which motor would rotate the pinion 176 in the opposite direction and advance the rack 168 to pivot the elevators in the opposite direction, thus bringing the plane back to level flight.

In Figures 7 and 8, I illustrate a slightly different form of construction for the weight pendulums 204. An inverted U-shaped member 206 is welded inside a tube 208. This tube is positioned inside an outer tube 210, and the two tubes are fashioned to provide roller bearings 212 positioned between the two ends of the two tubes. Inner tube 208 is threaded at 214 for connection with the rings 216 comprising portions of the bearings 212 for holding the two tubes in assembled relation. The rack 218 is slidable inside the member 206 and is supported by roller bearings 220. The pendulum 204 pivots about the shaft 222 in the same manner as the pendulum 114. Flanges 224 on the outer tube 210 are fixedly related to supports 226. Inner tube 208 is arranged to rotate freely inside the tube 210 to permit the pendulum to assume true vertical positions.

I claim:

1. A stabilizer for airplanes having flight controls, power means, gravity sensitive means for operatively connecting the flight controls and the power means when the airplane deviates from level flight, to bring the airplane back to level flight, said gravity sensitive means including a tubular support, an inner tube rotatably related to the tubular support, and a gravity responsive weight pivotal inside the inner tube for rotation about an horizontal axis, the weight of the gravity sensitive weight turning the inner tube for maintaining said axis horizontal in all angular positions of the airplane.

2. A stabilizer for airplanes having flight controls, power means, gravity sensitive means for operatively connecting the flight controls and the power means when the airplane deviates from level flight, to bring the airplane back to level flight, said gravity sensitive means including a rotary bar support, and a gravity sensitive weight pivoted to the support for rotation about an horizontal axis, the load of the weight rotating the support for maintaining said axis horizontal in all angular positions of the airplane.

3. A stabilizer for airplanes having aileron controls, a driven shaft, friction rollers driven by the shaft in opposite direction, friction rollers carried by the aileron controls, a gravity responsive means for moving one of the last mentioned friction rollers into engagement with one of the friction rollers carried by the driven shaft for moving the aileron controls in one direction, said gravity responsive means when moved in another direction causes the other friction roller of the driven shaft to engage the other roller of the aileron controls for moving the aileron controls in the opposite direction, and means for rendering the gravity responsive means inoperative to permit manual control of the aileron controls.

4. A stabilizer for airplanes having elevator and aileron controls, a pair of electric motors, means operated by the motors for operating the elevator control, gravity responsive means for closing the circuit to one motor when the airplane deviates upwardly and closing the circuit to the other motor when the airplane deviates downwardly, a power shaft driven by the motor of the airplane, friction rollers driven by the power shaft, friction rollers carried by the aileron controls, and gravity responsive means for moving the last mentioned friction roller into engagement with the friction rollers carried by the power shaft.

5. A stabilizer for airplanes having aileron controls, a power shaft driven by the motor of the airplane, friction rollers driven by the power shaft, friction rollers carried by the aileron controls, a gravity responsive means comprising a rigidly supported cylindrical member, a cylindrical member rotatably supported in the first cylindrical member, an intermediately pivoted weight carried by the inner cylindrical member, and means operated by the upper end of the intermediately pivoted weight for moving the friction rollers carried by the aileron controls into and out of engagement with the friction rollers driven by the power shaft.

6. A stabilizer for airplanes having aileron controls, two spaced friction rollers driven in opposite directions by the power shaft driven by the motor of the airplane, a longitudinally movable bar, friction rollers carried by said bar and adapted to separately engage the spaced friction rollers, means carried by the shafts of the friction rollers carried by the bar for operating the aileron controls, and gravity responsive means connected to the said bar for moving one of the rollers into engagement with one of the spaced friction rollers according to the direction of movement of the gravity responsive means.

7. A stabilizer for airplanes having aileron controls, two spaced friction rollers driven in opposite directions by the power shaft driven by the motor of the airplane, a longitudinally movable bar, friction rollers carried by the ends of said bar and adapted to engage either one of the spaced friction rollers, gears carried by the shafts of the rollers carried by the bar, a rack longitudinally movable and engaging said gears, connections between the ends of the rack and the aileron controls, and gravity responsive means connected to the ends of the longitudinally movable bar for moving one of the rollers carried thereby into engagement with one of the spaced driven rollers according to the direction of movement of the gravity responsive means.

RALPH A. OPENSHAW.